United States Patent
Anim-Appiah et al.

(10) Patent No.: US 7,421,018 B2
(45) Date of Patent: Sep. 2, 2008

(54) SYSTEM AND METHOD FOR SELECTING PRECURSOR EQUALIZER COEFFICIENTS AND SERIALIZER DESERIALIZER INCORPORATING THE SAME

(75) Inventors: Kofi D. Anim-Appiah, Allen, TX (US); Nirmal C. Warke, Irving, TX (US); Song Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 718 days.

(21) Appl. No.: 10/833,904

(22) Filed: Apr. 28, 2004

(65) Prior Publication Data

US 2005/0089089 A1    Apr. 28, 2005

Related U.S. Application Data

(60) Provisional application No. 60/513,883, filed on Oct. 23, 2003.

(51) Int. Cl.
*H03H 7/30*        (2006.01)
(52) U.S. Cl. .................................................. 375/232
(58) Field of Classification Search ................. 375/229, 375/232, 233; 714/704; 333/103
See application file for complete search history.

(56) References Cited

U.S. PATENT DOCUMENTS

| | | | | |
|---|---|---|---|---|
| 6,606,010 | B1 * | 8/2003 | Poklemba et al. | 332/103 |
| 2003/0016743 | A1 * | 1/2003 | Curran et al. | 375/229 |
| 2004/0066755 | A1 * | 4/2004 | Lin et al. | 370/252 |
| 2004/0268190 | A1 * | 12/2004 | Kossel et al. | 714/704 |
| 2005/0052255 | A1 * | 3/2005 | Chiang | 333/18 |
| 2005/0188284 | A1 * | 8/2005 | Proano et al. | 714/47 |

OTHER PUBLICATIONS

Forney, Jr., et al; "Combined Equalization and Coding Using Precoding"; IEEE Communications Magazine; vol. 29, No. 12, pp. 25-34; Dec. 1991.

Austin; "Decision-Feedback Equalization for Digital Communication Over Dispersive Channels"; MIT Lincoln Laboratory, Tech. Report No. 437; Aug. 1967.

* cited by examiner

*Primary Examiner*—Chieh M. Fan
*Assistant Examiner*—Jaison Joseph
(74) *Attorney, Agent, or Firm*—Steven A. Shaw; W. James Brady; Frederick J. Telecky, Jr.

(57) ABSTRACT

In one aspect, the present invention provides a system and method for selecting precursor equalizer coefficients and a serializer deserializer (SERDES) incorporating the system or the method. In one embodiment, the system includes: (1) a cost definer configured to generate an eye height cost function based on continuous-time channel and crosstalk symbol responses pertaining to a particular serial link and (2) a cost evaluator associated with the cost definer and configured to evaluate the eye height cost function based on a particular criterion thereby to produce coefficients for a precursor equalizer to be applied with respect to the particular serial link.

12 Claims, 2 Drawing Sheets

SYSTEM AND METHOD FOR SELECTING PRECURSOR EQUALIZER COEFFICIENTS AND SERIALIZER DESERIALIZER INCORPORATING THE SAME

CROSS-REFERENCE TO PROVISIONAL APPLICATION

This application claims the benefit of U.S. Provisional Application No. 60/513,883, filed Oct. 23, 2003, by Anim-Appiah, et al., entitled "Precursor Equalization Selection for High Speed Serial Links" and incorporated herein by reference in its entirety.

TECHNICAL FIELD OF THE INVENTION

The present invention is directed, in general, to equalization relative to a communication channel and, more specifically, to a system and method for selecting precursor equalizer coefficients and a serializer deserializer (SERDES) incorporating the system or the method.

BACKGROUND OF THE INVENTION

High speed serial links operating at over 3 gigabits per second (Gbs) over distances in excess of several feet using only copper traces on conventional FR-4 dielectric printed circuit board (PCB) electrical backplanes have become commonplace. In fact, transceivers operating at rates in excess of 6 Gbs over similar PCB-based serial links are now becoming available in the marketplace. It is expected that rates of 10 Gbs will soon be introduced.

Such serial links commonly employ a serializer deserializer (SERDES) for multiplexing and demultiplexing multiple high speed data streams. As the bit rates (and concomitant frequencies) in these applications have escalated over time, system designers have had to contend with the difficulty of communicating over these increasingly dispersive links without concomitant sacrifice in system performance. The current trend in the design of these transceivers is to gravitate towards techniques more commonly encountered in digital communications system design: increased reliance on signal processing and statistical system characterization. One of the more prominent examples of this design philosophy is evident in the application of equalization to combat the increased frequency selectivity of the channel.

The decision feedback equalizer (DFE) (see, Austin, "Decision-Feedback Equalization for Digital Communication Over Dispersive Channels," MIT Lincoln Laboratory, Tech. Report No. 437, August 1967, incorporated herein by reference) has become very popular in communications system design due to its effectiveness under a wide variety of channel types. This nonlinear equalizer is especially effective on channels with severe dispersion, because it can correct for channel imperfections without displaying the excessive noise enhancement of a linear equalizer.

A DFE has a precursor (or feedforward) equalizer, F(z), and a postcursor (or feedback) equalizer, B(z). The precursor equalizer is a linear transversal filter, the purpose of which is to cancel precursor intersymbol interference (ISI). The precursor equalizer does this by filtering the channel output, attempting to relocate most of the channel precursor energy to the postcursor response of the filtered P(z)F(z).

The postcursor equalizer, B, is strictly causal ($b_i=0$ for $i \in \{-\infty,\ldots,0\}$). B uses past decisions to cancel the remaining postcursor ISI from the current decision variable. A nonlinear symbol-rate slicer located in the feedback loop performs this cancellation and accounts for the nonlinear behavior of the DFE.

In a classical DFE implementation, F and B are both adapted to P by an adaptation algorithm based on one of several possible criteria. Two well-known criteria are zero forcing and minimum mean squared error. A popular adaptation algorithm is the least mean squared (LMS) algorithm or one of its variants (see, Proakis, Digital Communications, $3^{rd}$ ed., New York: McGraw-Hill, 1995).

Adaptation of the equalizers F and B to P can occur either in "trained" or "blind" modes. The trained mode calls for the transmitter to send a symbol sequence that is known to the receiver. The receiver then substitutes the known "perfect" sequence for the (possibly incorrect) detected sequence during adaptation (usually when the physical layer link is established or channel conditions change). The blind mode is characterized by the absence of any training data. Adaptation proceeds solely on receiver decisions.

The equalizers F and B operate at the symbol rate (F may operate at some integer multiple of the symbol rate). In high speed serial links this can be rather challenging to implement for a variety of reasons. In particular, digital transversal filters typically require the use of high-speed analog-to-digital converters (ADCs) with many bits of resolution, which are difficult to design for gigabit rates. Analog implementation may require use of analog delay lines, which are also difficult to design for gigabit rates.

To circumvent some of these and other difficulties, it is conventional to augment the transmitter with either postcursor or precursor cancellation. Postcursor cancellation is generally known as Tomlinson-Harashima preceding (see, Forney, Jr, et al., "Combined Equalization and Coding Using Precoding," IEEE Communications Magazine, Vol. 29, No. 12, pp. 25-34, December 1991, incorporated herein by reference) and is often motivated more by concerns about error propagation. Precursor cancellation is often referred to as "preemphasis."

Unfortunately, precursor cancellation at the transmitter often creates significant problems at the receiver. Precursor cancellation at the transmitter renders adaptive derivation of filter coefficients virtually impossible unless the link is bidirectional. This is because, while it may be possible to measure P at the receiver (using a training sequence) and thus derive F, no feedback mechanism (or "back channel") exists to communicate the derived F back to the transmitter. Thus F may have to be fixed for a particular channel.

Given knowledge of P, F can be selected based on a priori knowledge of the particular phase to which the CR circuit in the receiver should lock. This computation may be based on knowledge of the specific criteria used by the CR circuit to acquire lock. For example, the CR circuit can be designed to converge to the specific phase that minimizes the residual amplitude at the crossing point between two successive symbols of equal amplitude but of opposite polarity.

The practical reality of this situation, though, is that the CR circuit might not always converge to and maintain lock at the exact optimum phase for which it was designed. This results in at least two kinds of offsets. First, even at steady state, the instantaneous phase will exhibit some fluctuation about the time-averaged value. Second, some difference will always be evident between the phase at which the CR circuit should lock and the phase at which it actually does lock due to a myriad of possible design-related concessions. If the two phases differ significantly from one another, the result will almost certainly be a degradation of the symbol error rate (SER) due to mis-equalization. This is because the two phases require different "F"s. The postcursor equalizer B may be able to compensate to some extent for any residual postcursor intersymbol interference (ISI) introduced by using a different F, but no such relief exists where residual precursor ISI is concerned.

Accordingly, what is needed in the art is a better way to perform precursor equalization. What is further needed in the art is a SERDES that incorporates a better way to select precursor equalizer coefficients.

SUMMARY OF THE INVENTION

To address the above-discussed deficiencies of the prior art, the present invention provides, in one aspect, a system for selecting precursor equalizer coefficients. In one embodiment, the system includes: (1) a cost definer configured to generate an eye height cost function based on continuous-time channel and crosstalk symbol responses pertaining to a particular serial link and (2) a cost evaluator associated with the cost definer and configured to evaluate the eye height cost function based on a particular criterion thereby to produce coefficients for a precursor equalizer to be applied with respect to the particular serial link.

In another aspect, the present invention provides a method of selecting precursor equalizer coefficients. In one aspect, the method includes: (1) generating an eye height cost function based on continuous-time channel and crosstalk symbol responses pertaining to a particular serial link, (2) evaluating the eye height cost function based on a particular criterion and (3) producing coefficients for a precursor equalizer to be applied with respect to the particular serial link based on the evaluating.

In yet another aspect, the present invention provides a SERDES. In one embodiment, the SERDES includes: (1) a receiver portion and (2) a transmitter portion associated with the receiver portion and including: (2a) a phase-locked loop (PLL), (2b) a parallel to serial converter associated with the PLL and including a DFE, (2c) a cost producer configured to generate an eye height cost function based on continuous-time channel and crosstalk symbol responses pertaining to a particular serial link and (2d) a cost evaluator associated with the cost producer and configured to evaluate the eye height cost function based on a particular criterion thereby to produce coefficients for the precursor equalizer.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
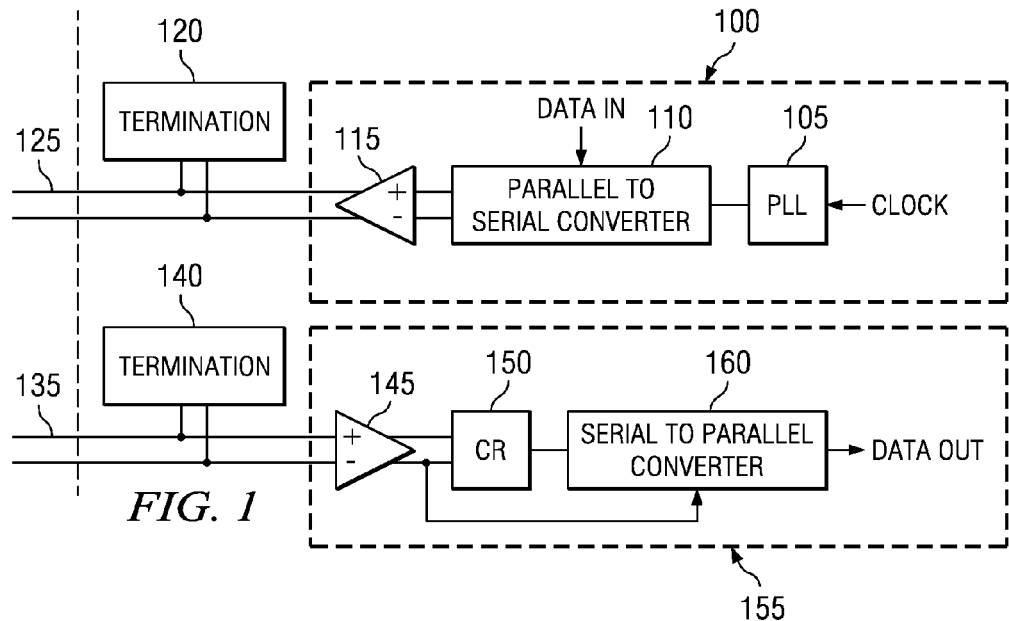
FIG. 1 illustrates a block diagram of a SERDES including a DFE that, in turn, incorporates a system for performing precursor equalization with respect to a high speed serial link constructed according to the principles of the present invention.

Referring initially to FIG. 1, illustrated is a block diagram of a SERDES incorporating a system for performing precursor equalization with respect to a high speed serial link constructed according to the principles of the present invention. Those skilled in the pertinent art are generally familiar with the structure and function of a SERDES, and so they will not be set forth in great detail herein, except to the extent that they directly bear on an understanding of the present invention.

The SERDES includes a transmitter portion 100 and a receiver portion 155. A phase-locked loop (PLL) 105 in the transmitter portion 100 receives and stabilizes a clock signal ("CLOCK"). A parallel to serial converter 110 receives parallel input data ("DATA IN") and the stabilized clock signal from the PLL 105. The parallel to serial converter provides serial data output to a line driver 115, which drives a properly terminated (via a termination 120) high speed serial link 125.

A properly terminated (via a termination 140) high speed serial link 135 (which may be the same as the high speed serial link 125) leads to a line buffer 145. Serial data provided from the line buffer 145 is provided to a clock recovery (CR) circuit 150 and a serial to parallel converter 160. The CR circuit 150 recovers the clock signal embedded in the serial data and provides the recovered clock signal to the serial to parallel converter 160 to synchronize it with respect to the serial data. The serial to parallel converter converts the serial data into parallel data ("DATA OUT").

The illustrated embodiment of the system of the present invention is located proximate a decision feedback equalizer (DFE) that is part of the parallel to serial converter 110 in the transmitter section 100.

Figure 2:
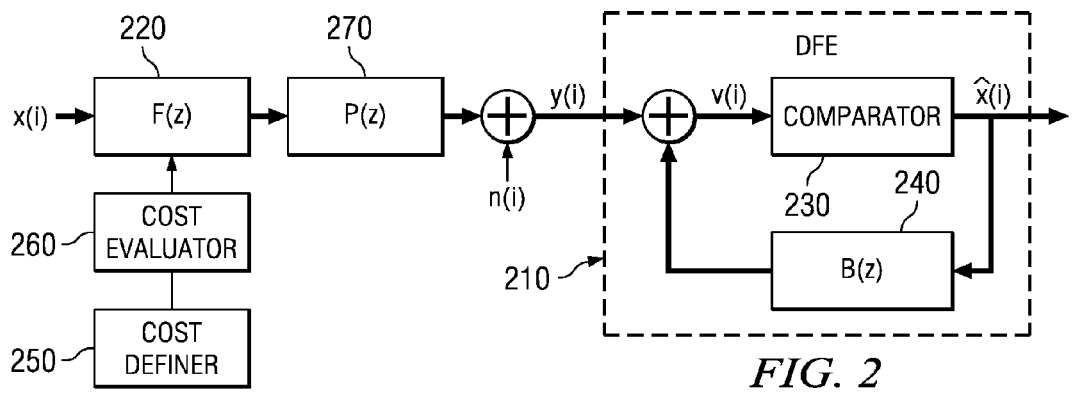
FIG. 2 illustrates a block diagram of the DFE and system for performing precursor equalization of FIG. 1.

Turning now to FIG. 2, illustrated is a block diagram of the DFE, generally designated 210, and system for performing precursor equalization of FIG. 1. A precursor equalizer 220 receives and processes a stream of symbols x(i). These symbols are then transmitted through a channel 270. A DFE 210 receives and processes the channel output y(i). A comparator 230 in the DFE 210 processes the stream of symbols (now v(i)) to yield an output stream x̂(i). A postcursor equalizer 240 processes the output of the comparator 230. The output of the postcursor equalizer 240 is then combined with the channel output y(i) to yield v(i). Before describing the system of the present invention in greater detail, theoretical details regarding the system's operation will now be set forth.

It is assumed that, during operation, P is known on the unit circle. That is, the frequency response $$P(e^{j\omega T}) = P(z)|_{z=e^{j\omega T}}$$

is known, but not P(z). (T is the symbol duration.) This is equivalent to ambiguity about the actual phase of the channel that is sampled to generate $\{p_i\}$. In practice, the continuous-time channel response will be effectively sampled at a particular phase that results in one set of $\{p_i\}$ out of an infinite number of sets.

For notational convenience, the particular $\{p_i\}$ resulting from sampling the channel at phase p will be referred to as $p(\phi)$. Thus, $\phi$ is a continuous temporal variable in the range $[0,2\pi/T]$. The z-transform of $p(\phi)$ will also be referred to as $_\phi(z)$. In serial link design, this phase sampling occurs by the mechanism of the CR circuit locking to some phase of the received signal. The particular phase to which the CR circuit locks depends on the circuit design criterion. Thus, a fixed F is selected based on knowledge of $P(e^{j\omega T})$.

Many factors influence the selection of a fixed F at the transmitter. One of the most important of these factors in high-speed serial link design arises from the fact that $p(\phi)$ can be quite sensitive to $\phi$. Thus, for two distinct phases $\phi_1$ and $\phi_2$, $p(\phi_1)$ and $p(\phi_2)$ can be significantly different, especially when significant channel attenuation is evident at the Nyquist frequency (½T). Given knowledge of $P(e^{j\omega T})$, F can be selected based on a priori knowledge of the particular $\phi$ to which the CR circuit should lock. This computation will be based on knowledge of the specific criteria used by the CR circuit to acquire lock. For example, the CR circuit can be designed to converge to the specific $\phi_{min}$ that minimizes the residual amplitude at the crossing point between two successive symbols of equal amplitude but of opposite polarity.

The practical reality of this situation, though, is that the CR circuit might not always converge to and maintain lock at the exact optimum $\phi_{opt}$ for which it was designed. This results in at least two kinds of offsets. First, even at steady state, the instantaneous phase will exhibit some fluctuation about the time-averaged denoted by $\phi_{ss}(t)$ and the time-averaged value by $\phi_{ss}$. $<x(t)>$ denotes the time-averaged value of $x(t)$, so $\phi_{ss}=<\phi_{ss}(t)>$.

Second, some difference will always be evident between $\phi_{opt}$ and $\phi_{ss}$ due to a myriad of possible design-related concessions. If $p(\phi_{ss})$ differs significantly from $p(\phi_{opt})$, the result will almost certainly be a degradation of the symbol error rate (SER) due to misequalization. This is because $p(\phi_{ss})$ and $p(\phi_{opt})$ require different Fs: $F_{\phi ss}$ and $F_{\phi opt}$, respectively. To some extent, the adaptive postcursor equalizer B may be able to compensate for the residual postcursor ISI introduced by using $F_{\phi opt}$ instead of the a priori unknown $F_{\phi ss}$, in which case the postcursor equalizer has to equalize $F_{\phi opt}(z)F_{\phi ss}(z)$ instead of $F_{\phi opt}(z)F_{\phi opt}(z)$. Unfortunately, no such relief exists where residual precursor ISI is concerned.

The selection of the precursor equalizer F based on several alternative criteria will now be discussed. The relative merits of each of the chosen criteria will also be evaluated based on the discussion above. Also, the discussion will be directed to systems employing M-ary pulse amplitude modulation (M-PAM), although those skilled in the pertinent art will see that the inventive concepts disclosed herein are readily extensible to other modulation techniques. Finally, the discrete-time sequence x will often be represented by its z transform $X(z)$:

$$X(z) = \sum_{i=-\infty}^{\infty} x_i z^{-i} \tag{1}$$

Where unambiguous, the complex variable z may be suppressed for brevity.

The M-PAM serial link is modeled by:

$$y(t) = \sum_i x_i p(t - iT) + n(t) \tag{2}$$

with $y(t)$ the continuous-time channel output signal, $p(t)$ the symbol response of the overall channel, and with $x_i \in \{A_m\}$ with:

$$A_m = 2m-1-M, \; m=1,2,\ldots,M \tag{3}$$

Here, $\{A_m\}$ is the symbol alphabet. For M=2 the symbol alphabet is $\{-1,+1\}$; for M=4, the symbol alphabet is $\{-3,-1,+1,+3\}$. $n(t)$ represents the crosstalk noise process, both far end crosstalk ("FEXT") and near end crosstalk ("NEXT"), at the channel output. Assuming baud-rate sampling, when $y(t)$ is sampled at times $t=kT$ the discrete-time representation:

$$y(kT) = \sum_i x_i p(kT - iT) = \sum_i x_i p[(k-i)T] + n(kT) \tag{4}$$

is obtained. Defining $y(kT)=y_k$, (and similarly for p and n) yields:

$$y_k = \sum_i x_i p_{k-i} = \sum_{i=-\delta}^{L-\delta-1} p_i x_{k-i} + n_k \tag{5}$$

where L is the length of the overall channel symbol response in number of T-spaced samples. $p=\{p_i\}$ is modeled as having $\delta$ precursor taps.

As mentioned earlier, a T-spaced precursor equalizer F is assumed to be implemented at the transmitter. F is assumed to have $n_f$ taps. Finite precision is also assumed for each of the $f_i$, resulting in a finite number of possible sets of F from which to select. It is therefore assumed that, given continuous-time channel and crosstalk symbol responses, it is possible to select a particular F and evaluate some figure of merit for it based on these symbol responses.

As mentioned earlier, the CR circuit is usually designed to sample the channel symbol response at some phase $\phi_{opt}$. This phase depends on the criterion for which the CR circuit is designed. It is assumed that, given continuous-time channel and crosstalk symbol responses $p(t)$ and $n(t)$ respectively, $\phi_{opt}$ can be computed. With a T-spaced $\{f_i\}$ at the transmitter, modified symbols $x'_i = x_i * f_i$ are transmitted so that equation (2) may be rewritten as:

$$y(t) = \sum_i x'_i p(t - iT) + n(t) \tag{6}$$

which is equivalent to:

$$y(t) = \sum_i x_i p^F(t - iT) + n(t) \tag{7}$$

with the effective combined symbol response $p^F(t)$ (precursor equalizer and channel) given by:

$$p^F(t) = \sum_{j=-k}^{n_{ff}-k-1} f_j p(t - jT) \quad (8)$$

Likewise, the effective combined crosstalk symbol response, $n^F(t)$, is:

$$n^F(t) = \sum_{j=-k}^{n_{ff}-k-1} f_j n(t - jT) \quad (9)$$

The T-spaced effective "through" channel and crosstalk symbol responses, respectively, sampled at phase $\phi$ are then:

$$p_k^F(\phi) \triangleq p^F([k + \phi/2\pi]T) \ k \in \{-\delta_p, -\delta_p + 1, \ldots, L_p - \delta_p - 1\} \quad (10)$$
$$n_k^F(\phi) \triangleq n^F([k + \phi/2\pi]T) \ k \in \{-\delta_p, -\delta_p + 1, \ldots, L_p - \delta_p - 1\}$$

In equation (10) above, $L_p$ and $L_n$ and are the lengths of $p^F(\phi)$ and $n^F(\phi)$, respectively, while $\delta_p$ and $\delta_n$ account for the delay of $p^F(\phi)$ and $n^F(\phi)$, respectively (the cursor occurs at $k=0$).

Given both $p^F(\phi)$ and $n^F(\phi)$, the corresponding B can be computed; this will usually be the mean-square error (MSE) solution or one of its variants. This is denoted by $b^F(\phi) = \{b_k^F(\phi)\}$.

With all the relevant quantities in place, several criteria for selection of F can now be introduced. For all methods, an eye height cost function $J(F,\phi)$ is defined as $$J(F, \phi) = p_0^F(\phi) - \sum_{\substack{k=-\delta_p \\ k \notin \{0,1,\ldots,n_{fb}\}}}^{L_p - \delta_p - 1} |p_k^F(\phi)| - \sum_{k=1}^{n_{fb}} |p_k^F(\phi) - b_k^F(\phi)| - \sum_{k=-\delta_n}^{L_n - \delta_n - 1} |n_k^F(\phi)| \quad (11)$$

$J(F, \phi)$ measures the eye opening when $p^F(\phi)$ and $n^F(\phi)$ are sampled at phase $\phi$. It is used generically for M-PAM as defined by equation (3).

Design Based on Single Phase—The Max Criterion

One criterion is to select the F that gives the most open eye when $p^F(t)$ is T-spaced sampled at phase $\phi_{opt}^F$. Thus, the $F_{max}$ for which $J(F,\phi_{opt}^F)$ is maximized is selected. $\phi_{opt}^F$ is a function of F (by way of $p^F(t)$), and it is determined for each F before evaluation of equation (11). Thus:

$$F_{max} = \underset{F}{\operatorname{argmax}}(J(F, \phi_{opt}^F)) \quad (12)$$

The advantage of this first criterion is that, since it selects $F_{max}$ to maximize the eye opening at phase $\phi_{opt}^{Fmax}$, the corresponding SER will be minimized with respect to F. This is certainly desirable.

Practically, selection of $F_{max}$ according to J(F) might not always be desirable. The reason is that if P(f) (the Fourier transform of p(t)) experiences significant attenuation at or close to the Nyquist frequency, $p(\phi)$ could be very sensitive to $\phi$. This ultimately results in $J(F_{max},\phi)$, being also being sensitive to $\phi$. In other words, if the CR circuit does not converge and lock to precisely phase $\phi_{opt}^F$, but converges instead to phase $(\phi_{opt}^F+\epsilon)$, the eye opening at this phase, $J(F_{max},\phi_{opt}^F+\epsilon)$, could be much smaller than $J(F_{max}, \phi_{opt}^F)$. Under such circumstances, the operating SER could be substantially higher than desired. All other things being equal, the likelihood of such severe lock phase sensitivity escalates as symbol rates are increased on a given channel. An alternative criterion that trades off maximum eye height for reduced lock-phase sensitivity will now be introduced.

Design Based on a Phase Window I—The MaxMin Criterion

Uncertainty in the actual lock phase of the CR circuit can be accommodated in the selection of F in several ways. One criterion is to ensure that, over a lock-phase excursion in the range $[\phi_{opt}^F-\epsilon, \phi_{opt}^F+\epsilon]$, the worst-case eye opening for fixed F, as a function of $\phi$, is maximized with respect to F. Thus, $$J(F,\phi), \phi_{opt}^F - \epsilon \leq \phi \leq \phi_{opt}^F + \epsilon$$

is evaluated for each F. The phase resolution, $\Delta\phi$, with which the above evaluation is performed is determined by that of the CR circuit; $\Delta\phi = (2\pi/64T)$ rad s$^{-1}$, which is better than a 2% phase resolution, is probably adequate. $\epsilon$ is determined by the overall system design. The figure of merit, $J_{min}(F,\epsilon)$, for each F is therefore $$J_{min}(F,\epsilon) = \min(J(F,\phi)), \phi_{opt}^F - \epsilon \leq \phi \leq \phi_{opt}^F + \epsilon \quad (13)$$

and so this criterion selects the $F_{maxmin}(\epsilon)$ that maximizes $J_{min}(F,\epsilon)$ with respect to F, that is, $$F_{\text{maxmin}}(\varepsilon) = \underset{F}{\operatorname{argmax}}(J_{\min}(F, \phi)) \quad (14)$$

In the evaluation of equation (13), $\phi_{opt}^F$ has to be determined first. Then as $\phi$ is varied with F fixed, B is recomputed each time, capturing the effect of the feedback tap adaptation. Within a reasonably narrow phase window centered at $\phi_{opt}^F$, $J(F,\phi)$ will be concave in $\phi$, and may often be monotonically decreasing in $\phi$ on either side of $\phi_{opt}^F$ in which case:

$$J_{min}(F) = \min(J(F,\phi_{opt}^F - \epsilon), J(F, \phi_{opt}^F + \epsilon)) \quad (15)$$

The computational burden associated with evaluating equation (14) is greatly lightened. Due to the emphasis placed on maximizing the worst-case eye height over a given phase window, in all likelihood, this criterion will not select the F that simultaneously maximizes eye height at $\phi_{opt}^F$. As a matter of fact, the eye height at $\phi_{opt}^F$ for the selected F can be significantly less than $J(F_{max}(\phi_{opt}^F))$, especially for large $\epsilon$. But for practical designs where lock-phase uncertainty cannot be circumvented, this second criterion provides an advantageous choice.

Design Based on a Phase Window II—The MaxMean Criterion

If the worst-case and best-case eye opening are not of critical concern, another criterion that can yield good eye height over a prescribed phase window is the mean eye height over that window. This strikes a compromise between the best and worst eye heights. So, for this criterion, the figure of merit, $J_{mean}(F,\epsilon)$, for each F is therefore:

$$J_{mean}(F, \varepsilon) = \frac{1}{2\varepsilon} \int_{\phi_{opt}^F - \varepsilon}^{\phi_{opt}^F + \varepsilon} d\phi J(F, \phi) \quad (16)$$

It may be simpler to perform the averaging over a finite set of phases in the phase window. If the phase resolution is $\Delta\phi$, equation (16) may be rewritten as:

$$J_{mean}(F, \varepsilon) = \frac{1}{2N+1} \sum_{n=-N}^{N} J(F, \phi_n) \quad (17)$$

with $\phi_n = \phi^F_{opt} + n\varepsilon/N$ and $N = \varepsilon/\Delta\phi$. This criterion therefore selects the $F_{maxmean}(\varepsilon)$ that maximizes $J_{mean}(F,\varepsilon)$ with respect to F, that is:

$$F_{maxmean}(\varepsilon) = \underset{F}{\mathrm{argmax}}(J_{mean}(F, \varepsilon)) \quad (18)$$

Having now described several criteria for selecting coefficients for a precursor equalizer F, a general system can now be described. Returning to FIG. 2, the system includes a cost definer 250. The cost definer 250 is configured to generate an eye height cost function based on continuous-time channel and crosstalk symbol responses pertaining to a particular serial link. The system further includes a cost evaluator 260. The cost evaluator 260 is associated with the cost definer 250 and is configured to evaluate the eye height cost function based on a particular criterion thereby to produce coefficients for the precursor equalizer 220. The criterion may be based on a single phase (e.g., Max) or on a phase window (e.g., MaxMin or MaxMean). If a phase window, the phase window may be centered about an optimal receiver lock-phase. In an alternative embodiment, the system further produces coefficients for the postcursor equalizer 240.

Figure 3:
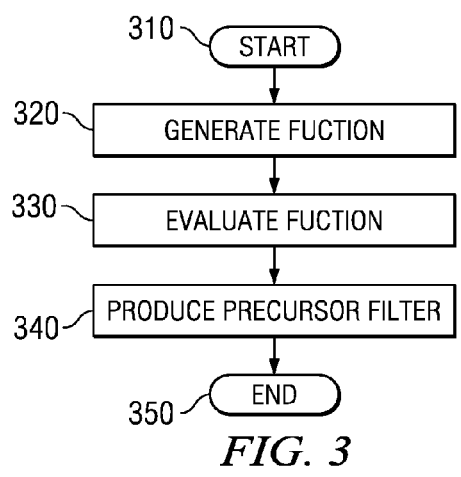
FIG. 3 illustrates a flow diagram of a method of performing precursor equalization with respect to a high speed serial link carried out according to the principles of the present invention.

Turning now to FIG. 3, illustrated is a flow diagram of a method of performing precursor equalization with respect to a high speed serial link carried out according to the principles of the present invention. The method begins in a start step 310 wherein it is desired to select precursor equalizer coefficients.

The method proceeds to a step 320 in which an eye height cost function based on continuous-time channel and crosstalk symbol responses pertaining to a particular serial link is generated. The method then proceeds to a step 330 in which the eye height cost function is evaluated based on a particular criterion. Three possible criteria are set forth above, but others fall within the broad scope of the present invention. The method next proceeds to a step 340 wherein coefficients for a precursor equalizer to be applied with respect to the particular serial link based on the evaluating are produced. In an optional step (not shown), coefficients for a postcursor equalizer to be applied with respect to the particular serial link are also defined. The method ends in and end step 350.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Figure 4:
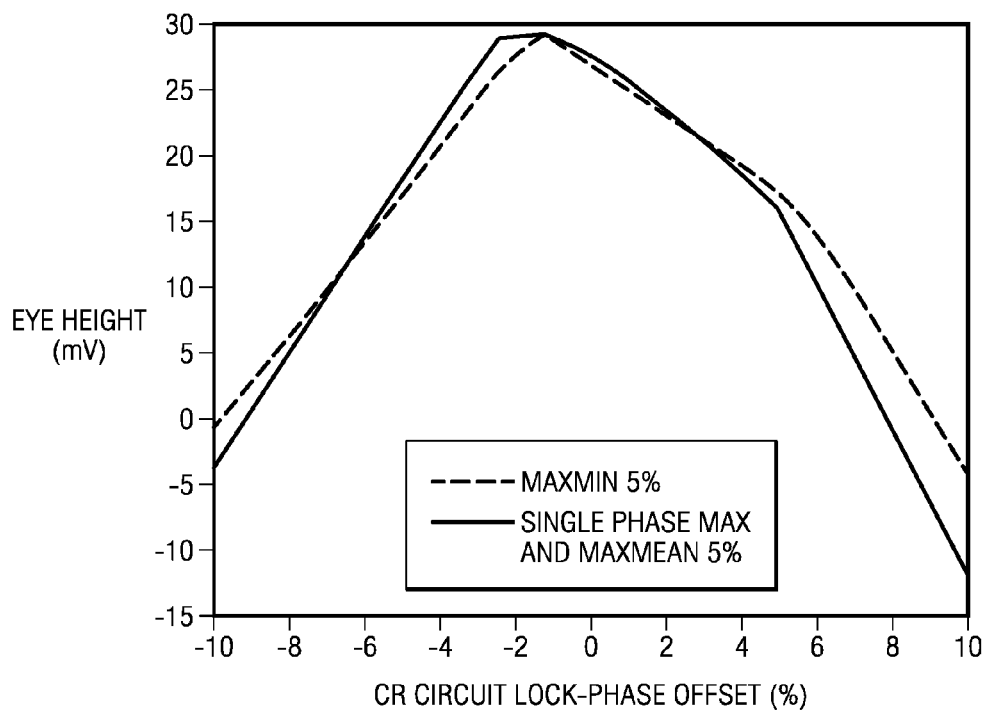
FIG. 4 illustrates a graph of eye height versus clock recovery (CR) circuit lock-phase offset for single phase Max and MaxMin and MaxMean with a 5% phase window.

Turning now to FIG. 4, illustrated is a graph of eye height versus CR circuit lock-phase offset for single phase Max and MaxMin and MaxMean with a 5% phase window. From FIG. 4, it is apparent that the curves are generally centered within a 2% phase offset, which is well within the acceptable range.

Figure 5:
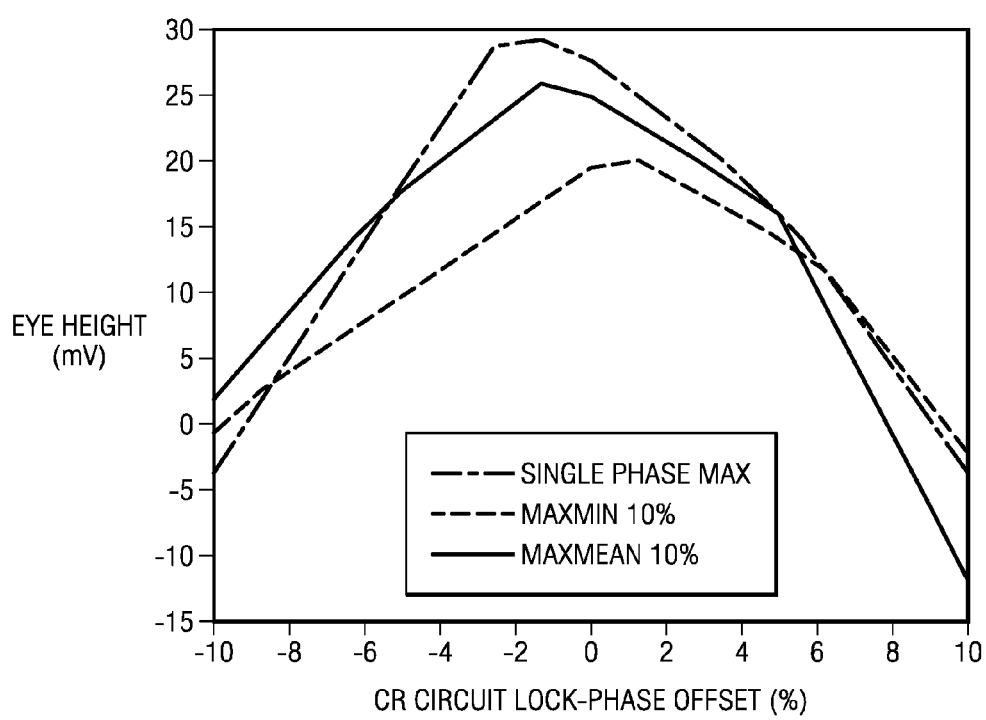
FIG. 5 illustrates a graph of eye height versus CR circuit lock-phase offset for single phase Max and MaxMin and MaxMean with a 10% phase window.

Turning now to FIG. 5, illustrated is a graph of eye height versus CR circuit lock-phase offset for single phase Max and MaxMin and MaxMean with a 10% phase window. From FIG. 5, it is apparent that the MaxMin and MaxMean curves, while not as high as the single phase Max curve, are wider and therefore can accommodate a wider phase offset by the receiver.

Although the present invention has been described in detail, those skilled in the art should understand that they can make various changes, substitutions and alterations herein without departing from the spirit and scope of the invention in its broadest form.

What is claimed is:

1. A system for selecting precursor equalizer coefficients, comprising:
   a cost definer configured to generate an eye height cost function based on continuous-time channel and crosstalk symbol responses pertaining to a particular serial link; and
   a cost evaluator associated with said cost definer and configured to evaluate said eye height cost function based on a lock phase window thereby to produce coefficients for a precursor equalizer to be applied with respect to said particular serial link.

2. The system as recited in claim 1 wherein said phase window is centered about an optimal receiver lock-phase.

3. The system as recited in claim 1 wherein said serial link is embodied in copper traces on an FR-4 dielectric backplane.

4. The system as recited in claim 1 wherein said system further produces coefficients for a postcursor equalizer to be applied with respect to said particular serial link.

5. A method of selecting precursor equalizer coefficients, comprising:
   generating an eye height cost function based on continuous-time channel and crosstalk symbol responses pertaining to a particular serial link;
   evaluating said eye height cost function based on a lock phase window; and
   producing coefficients for a precursor equalizer to be applied with respect to said particular serial link based on said evaluating.

6. The method as recited in claim 5 wherein said phase window is centered about an optimal receiver lock-phase.

7. The method as recited in claim 5 wherein said serial link is embodied in copper traces on an FR-4 dielectric backplane.

8. The method as recited in claim 5 further comprising defining coefficients for a postcursor equalizer to be applied with respect to said particular serial link.

9. A serializer deserializer (SERDES), comprising:
   a receiver portion; and
   a transmitter portion associated with said receiver portion and including:
   a phase-locked loop (PLL),
   a parallel to serial converter associated with said PLL and including a decision feedback equalizer (DFE),
   a cost producer configured to generate an eye height cost function based on continuous-time channel and crosstalk symbol responses pertaining to a particular serial link, and a cost evaluator associated with said cost producer and configured to evaluate said eye height cost function based on a lock phase window thereby to produce coefficients for said DFE.

10. The SERDES as recited in claim 9 wherein said phase window is centered about an optimal receiver lock-phase.

11. The SERDES as recited in claim 9 wherein said serial link is embodied in copper traces on an FR-4 dielectric backplane.

12. The SERDES as recited in claim 9 wherein said DFE further includes a postcursor equalizer and coefficients are further produced for said postcursor equalizer.

* * * * *